(12) United States Patent
    Block et al.

(10) Patent No.: US 9,299,111 B2
(45) Date of Patent: Mar. 29, 2016

(54) EFFICIENT PRESENCE DISTRIBUTION MECHANISM FOR A LARGE ENTERPRISE

(75) Inventors: Frederick P. Block, Westminster, CO (US); Dennis C. Episkopos, Westminster, CO (US)

(73) Assignee: Futurewei Technologies, Inc., Plano, TX (US)

( * ) Notice: Subject to any disclaimer, the term of this patent is extended or adjusted under 35 U.S.C. 154(b) by 475 days.

(21) Appl. No.: 13/602,769

(22) Filed: Sep. 4, 2012

(65) Prior Publication Data

US 2014/0067911 A1 Mar. 6, 2014

(51) Int. Cl.
| | | |
|---|---|---|
| *G06F 15/16* | (2006.01) | |
| *G06Q 50/00* | (2012.01) | |
| *H04L 12/437* | (2006.01) | |
| *H04L 12/433* | (2006.01) | |
| *H04L 29/08* | (2006.01) | |
| *H04M 3/42* | (2006.01) | |

(52) U.S. Cl.
CPC .............. *G06Q 50/01* (2013.01); *H04L 12/433* (2013.01); *H04L 12/437* (2013.01); *H04L 67/24* (2013.01); *H04L 67/2842* (2013.01); *H04M 3/42374* (2013.01)

(58) Field of Classification Search
CPC ....... H04L 67/24; H04L 67/22; H04L 51/043; H04L 12/5815; H04L 12/433; H04L 12/437
USPC .......................................................... 709/203
See application file for complete search history.

(56) References Cited

U.S. PATENT DOCUMENTS

| | | | | |
|---|---|---|---|---|
| 7,464,168 B1 * | 12/2008 | Abdelaziz et al. | ............ | 709/229 |
| 8,060,121 B1 * | 11/2011 | Sun et al. | ....................... | 455/458 |
| 2006/0010203 A1 * | 1/2006 | Mrsic-Flogel et al. | ........ | 709/205 |
| 2006/0167978 A1 * | 7/2006 | Ozugur et al. | ................ | 709/203 |
| 2007/0124393 A1 * | 5/2007 | Maes | ............................ | 709/206 |
| 2008/0010301 A1 * | 1/2008 | Tian et al. | ........................ | 707/10 |
| 2008/0222275 A1 * | 9/2008 | Yumoto | ......................... | 709/220 |
| 2008/0235178 A1 * | 9/2008 | Cambria et al. | .................. | 707/1 |
| 2008/0288572 A1 * | 11/2008 | Galvin et al. | ................. | 709/201 |

(Continued)

FOREIGN PATENT DOCUMENTS

| | | |
|---|---|---|
| CN | 101345742 A | 1/2009 |
| CN | 101635689 A | 1/2010 |
| CN | 102347847 A | 2/2012 |

OTHER PUBLICATIONS

Foreign Communication From a Counterpart Application, PCT Application No. PCT/CN2013/082394, International Search Report dated Nov. 28, 2013, 6 pages.

(Continued)

*Primary Examiner* — Blake Rubin
(74) *Attorney, Agent, or Firm* — Conley Rose, P.C.; Grant Rodolph; Brandt D. Howell (57) ABSTRACT

A method implemented in a network component, the method comprising receiving a presence information message from a presence server in a ring of a plurality of presence servers, removing content in the presence information message that is previously originated by the network component and previously sent on the ring, copying the presence information message locally for subsequent processing, appending to the presence information message buffered presence information from a local client coupled to the network component, and forwarding the presence information message to a second presence server in the ring.

26 Claims, 5 Drawing Sheets

(56) References Cited

U.S. PATENT DOCUMENTS

| | | | |
|---|---|---|---|
| 2009/0010163 A1* | 1/2009 | Isomura et al. | 370/235 |
| 2009/0157684 A1* | 6/2009 | Andersen et al. | 707/8 |
| 2009/0177729 A1* | 7/2009 | Ben Ezra et al. | 709/202 |
| 2009/0201535 A1* | 8/2009 | Nagao et al. | 358/1.15 |
| 2009/0276653 A1* | 11/2009 | Pattabhiraman et al. | 713/502 |
| 2010/0135154 A1* | 6/2010 | Cheung et al. | 370/223 |
| 2010/0271935 A1* | 10/2010 | Allasia et al. | 370/222 |
| 2010/0332647 A1* | 12/2010 | Agulnik et al. | 709/224 |
| 2011/0072154 A1* | 3/2011 | Bogdanovic et al. | 709/238 |
| 2011/0230173 A1 | 9/2011 | Vaehaelummukka | |
| 2011/0295957 A1* | 12/2011 | Ananthanarayanan et al. | 709/206 |
| 2013/0064069 A1* | 3/2013 | Huang et al. | 370/222 |

OTHER PUBLICATIONS

Foreign Communication From a Counterpart Application, PCT Application No. PCT/CN2013/082394, Written Opinion dated Nov. 28, 2013, 4 pages.

Johnston, A., Ed., et al., "A Batch Notification Extension for the Session Initiation Protocol (SIP)," draft-johnston-sipping-batch-notify-00, Mar. 2, 2009, 11 pages.

Roach, A.B., et al., "A Session Initiation Protocol (SIP) Event Notification Extension for Resource Lists," RFC 4662, Aug. 2006, 40 pages.

Schippers, J., "A Massively Scalable Architecture for Instant Messaging & Presence," http://essay.utwente.nl/59204/1/scriptie_J_Schipers.pdf, Master's Thesis, University of Twente, Enschede, Netherlands, Jul. 2009, 109 pages.

* cited by examiner

EFFICIENT PRESENCE DISTRIBUTION MECHANISM FOR A LARGE ENTERPRISE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network service which accepts, stores, and distributes presence information for a plurality of users may be referred to as a presence service. A presence service may be implemented on one or more servers, for example arranged in some architecture or topology in the network. A presence server in a network may be configured to receive and manage presence information from a user or client device, also referred to as a user equipment (UE) in some scenarios. Examples of a UE include smartphones, laptop computers, computer tablets, and desktop computers. A presence server may share the presence information of a user (on a UE) with other users (on one or more other UEs) that are authorized by the user to obtain such information either directly by sending the presence information to these other users or indirectly by sending the presence information to other presence servers which in turn distribute the presence information to other users. The presence information indicates the status of the user on the network, such as the availability, ability, or willingness of the user to communicate with other users of the network. Presence information has wide application in many communication services, such as instant messaging, voice over Internet Protocol (IP), and social networking services or applications.

To communicate presence information, a UE may display an indicator icon, for example corresponding to an instant messaging application, from a choice of graphic symbols with easy-to-convey meanings and a list of corresponding text descriptions of each of the states. Common states that indicate the user's availability are "free for chat", "busy", "away", "do not disturb", and "out to lunch". Such states exist in many variations across different instant messaging applications. Some applications also support a rich choice of additional presence attributes that can be used for presence information, such as user mood, location, or free text status.

In some presence distribution architectures, clients send presence updates to one of a pool of servers, which then distributes updates to all of the user's subscribed contacts. For example, both Session Initiation Protocol (SIP) for Instant Messaging and Presence Leveraging Extensions (SIMPLE) and Extensible Messaging and Presence Protocol (XMPP) presence standards discuss presence updates in terms of a subscribe/notify model, where the contact subscribes for presence updates from an originating user. The implementation is one where presence updates are sent from an originating user's device to one of a cluster of presence servers, which then distributes the presence updates to the user's contacts (typically through other servers). In such presence distribution architectures, the number of sent updates increases, e.g., proportionally, as the numbers of users, servers, and initiated updates increase, which can be substantial in larger networks (e.g., with hundred thousands of users) and incur substantial cost (e.g., in terms of used servers and resources). Reducing the number of used servers and/or sent presence information messages is desirable to reduce cost and improve efficiency (e.g., in terms of resource and network utilization).

SUMMARY

In one example embodiment, the disclosure includes a method implemented in a network component, the method comprising receiving a presence information message from a presence server in a ring of a plurality of presence servers, removing content in the presence information message that is previously originated by the network component and previously sent on the ring, copying the presence information message locally for subsequent processing, appending to the presence information message buffered presence information from a local client coupled to the network component, and forwarding the presence information message to a second presence server in the ring.

In another example embodiment, the disclosure includes a method for forwarding presence information implemented in a presence server coupled to a plurality of presence servers in a ring architecture, the method comprising receiving a presence information message on a link from a second presence server in the plurality of presence servers, processing the presence information message, receiving a local presence information message from a local client coupled to the presence server, processing the local presence information message, and processing previously received and buffered presence information intended to one or more local clients coupled to the presence server, wherein the presence information message has a higher priority than the local presence information message and the previously received and buffered presence information.

In yet another example embodiment, the disclosure includes a network component for processing and forwarding presence information to a plurality of presence servers coupled via a ring in one or more networks and a plurality of user devices coupled to the presence server, the network component comprising a processor configured to receive a presence information message from a previous hop on the ring, process and forward the presence information message, receive a local presence information message from a user device coupled locally to the network component, buffer the local presence information message for subsequent processing and forwarding, and forward previously received and buffered presence information to one or more intended clients coupled to the network component wherein the presence information message has a higher priority than the local presence information message and previously received and buffered presence information, wherein the presence information message has a higher priority than the local presence information message and the previously received and buffered presence information.

In yet another example embodiment, the disclosure includes a computer program product in a non-transitory computer readable media comprising first instructions executable by a processor for receiving a presence information message from a presence server in a ring of a plurality of presence servers, second instructions executable by a processor for removing content in the presence information message that is previously originated by the network component and previously sent on the ring, third instructions executable by a processor for copying the presence information message locally for subsequent processing, fourth instructions executable by a processor for appending to the presence information message buffered presence information from a local client coupled to the network component, and fifth instructions executable by a processor for forwarding the presence information message to a second presence server in the ring.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for presence information distribution. The presence information may be effectively broadcast to a set of presence servers arranged in a ring architecture. The presence information for one or more users may be sent from server to server on the ring in a high priority message (at a first rate), and may be sent to the user's contacts at a lower priority (at a second lower rate). For the number of users and contacts per user in a typical large enterprise (e.g., with about few hundred thousands of users), this scheme may reduce the total number of messages exchanged and processed by a presence server by a factor of about two or more, e.g., in comparison to a fan-out distribution architecture, without substantially affecting operations. This may increase efficiency and reduce cost since fewer servers may be used to support a population of users as compared to previous presence information distribution architectures.

Figure 1:
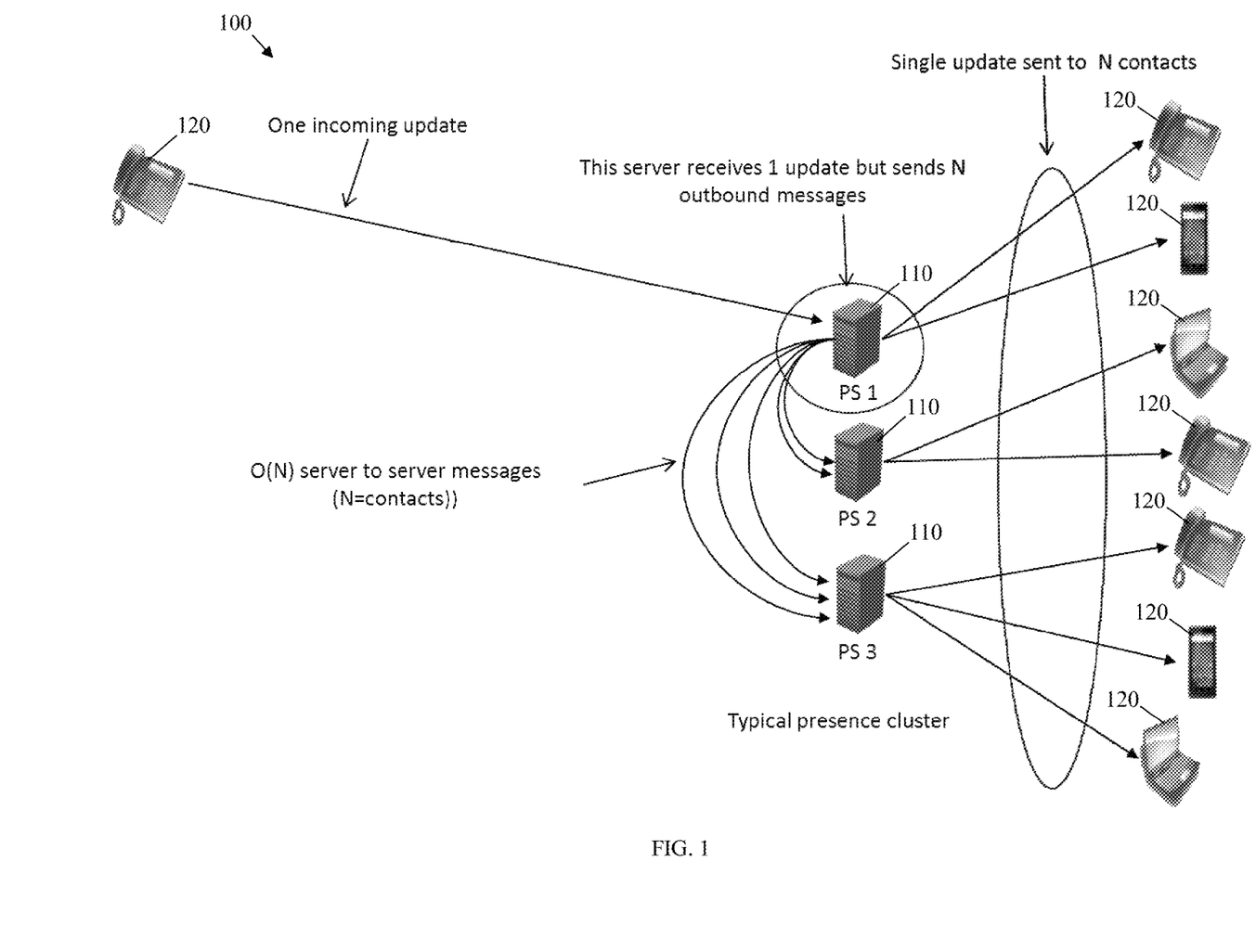
FIG. 1 is a schematic diagram of a typical presence distribution fan-out architecture.

FIG. 1 illustrates a typical presence distribution fan-out architecture 100, which may be used for presence distribution between users of one or more networks. For example, the presence distribution fan-out architecture 100 may be used based on the SIP-SIMPLE and XMPP presence standards. The presence distribution fan-out architecture 100 may include a plurality of servers 110 and a plurality of UEs 120 coupled to the servers 110. The servers 110 may be located in one or more networks, data centers, or combinations thereof. The servers 110 may be configured to receive, process, and forward presence information for a UE 120, including presence updates and presence queries. The queries may be sent from contacts of a user to request presence information updates (current status) from the user. The servers 110 may be any processors suitable for handling data, such as computer hardware, circuit cards or boards, and networking components (e.g., routers, switches). The UEs 120 may be any devices used by individuals (users) to communicate with each other (via one or more networks), exchange presence information (updates and queries), and run related applications. Examples of the UEs 120 include telephones, cellular telephones, smartphones, laptop computers, desktop computers, and tablet computers.

The presence distribution fan-out architecture 100 may distribute presence information traffic among a set of servers 110, which may fan out incoming presence updates from users to other users subscribed to the originating user's presence status. Each presence update sent from a UE 120 to a corresponding server 110 may cause about O(N) messages to be sent between the set of servers 110, where N is the number of contacts, i.e., the number of other UE 120 subscribed to receive presence status or updates from the originating UE 120. For instance, each of the servers 110 may send about N messages to the remaining servers 110 and the associated contacts (UEs 120). The notation O(N) signifies a linear or proportional increase in the messages from the servers 110 with respect to the number of UEs 120. Since the presence distribution fan-out architecture 100 scales the presence update messages linearly or proportionally with the number of UEs 120, a relatively large number of servers 110 (e.g., tens of servers) may be needed to handle a relatively large number of messages (e.g., hundreds of thousands of messages).

Figure 2:
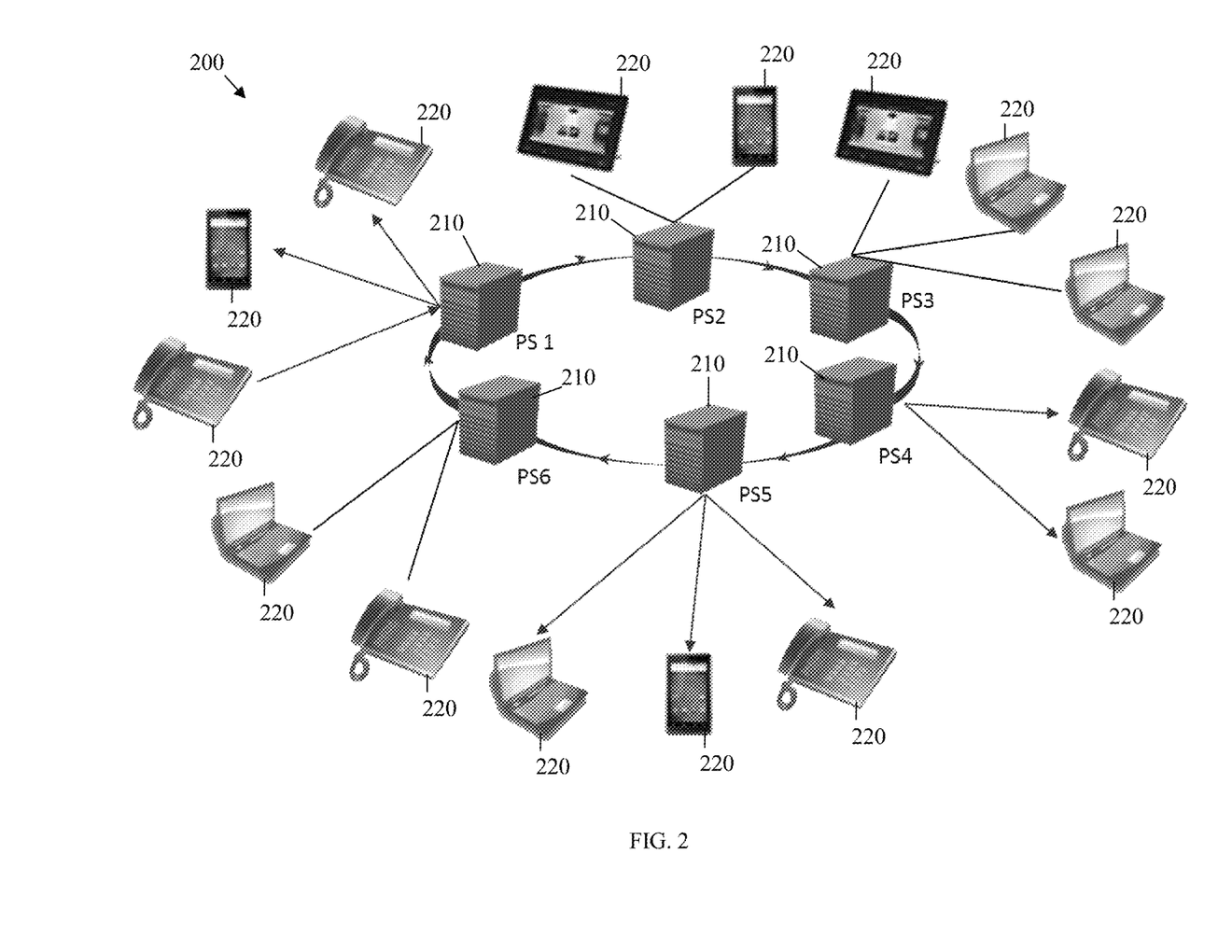
FIG. 2 is a schematic diagram of a presence distribution ring architecture according to an example embodiment of the disclosure.

FIG. 2 illustrates a presence distribution ring architecture 200 according to an example embodiment of the disclosure. The presence distribution ring architecture 200 may include a plurality of servers 210 and a plurality of UEs 220 coupled to the servers 210. The servers 210 and the UEs 220 may be similar to the servers 110 and the UEs 120, respectively. However, the servers 210 may be arranged in a ring topology, as shown in FIG. 2, where a ring (of links) may be established between the servers 210 and may be used to transport ring information or messages (including ring updates and queries) between the servers 210 in their corresponding order on the ring. The ring may be a unidirectional ring, where the presence information may be sent from server to server in sequence along the same direction (e.g., clockwise or counter clockwise) on the ring. Thus, each server 210 may be configured to send presence information to a next hop server 210 in the ring and receive presence information from a previous hop server 210 in the ring. Each server 210 may also exchange presence information messages with one or more UEs 220 that are coupled to that server 210.

The servers 210 may be configured to handle and distribute presence information from and to a UE 220, including presence queries and/or updates. A client (UE 220) may send a presence update or query (in a message) to a corresponding server 210. The presence update may indicate the user's availability status. The presence update may also indicate the originating user. The presence query may request for a user (a UE 220) presence information for one or more contacts of the user (other UE 220). The presence query may indicate the requesting user and the one or more contacts. For example, the presence update may be sent from a first client to a second client (another UE 210) that is subscribed to obtain such information from the first client. The presence update or query may also be sent from a client upon connecting to a server 210 as part of a set up procedure of an application that uses presence information. The server 210 may receive and buffer the presence update or query in local memory or a dedicated buffer. The received presence update or query may be buffered for a suitable time after which the server 210 forwards the update or query on the ring (to a next hop server 210). For example, a timer or the size of the buffer may be configured to determine the buffer time for the message update or query, and hence the rate for sending presence updates and queries on the ring of servers 210.

To forward the presence update or query on the ring, the server 210 may add the presence update or query to a presence information message that is forwarded as a single network message between the servers 210 on the ring. The server 210 may add the presence update or query to a presence information message received from a previous hop server 210 on the ring before forwarding the message to a next hop server 210. Alternatively, the server 210 may add the presence update or query to a new presence information message generated and sent by the server 210 onto the ring.

The server 210 may process the received presence information message before forwarding the message to a next hop server 210. For instance, the server 210 may delete in a received presence information message on the ring any content that was previously added by the server 210 and sent on the ring. Since the information (presence update or query) was passed from the server 210 along the ring before returning to the server 210, the information was at some point (at one or more other servers 210) handled and processed. Thus, the information may be removed by the originating server 210 to prevent further circulating unnecessary information on the ring. Processing the received presence information message may also include copying the message (e.g., in local memory or buffer) before further sending the message on the ring to handle locally at the server 210 any relevant content in the received message. The server 210 may buffer a copy of the message information message before sending the message to a next hop server 210. The copied information message received on the ring (from a previous hop server 210) may be buffered in the same or different buffer or memory location than the presence updates or queries received from the local UE 220 associated with the server 210. The server 210 may process the copied content to determine whether any presence updates or queries in the received message are intended for clients or UE 220 associated with the server 210, and hence send the presence updates or queries to the corresponding clients. Processing the received presence information message may also include appending any buffered presence updates or queries to the message, as described above. The appended presence updates and/or queries may be for one or more clients or UEs 220 associated with other servers 210.

The server 210 may process the exchanged presence information messages on the ring at a higher priority and rate than the presence information (update or query) from the local UE and the copied presence information from messages received on the ring. This may guarantee limited or reduced delays in exchanging the presence information messages between the servers 210 on the ring. The presence information (presence updates and queries) from local clients and the content copied from received messages on the ring may be handled by the server 210 at lower priority and rate, such as when the server 210 is idle or is not processing and forwarding presence information messages on the ring. As described above, handling the presence information from the local clients comprises receiving and buffering such information in a buffer or local memory. Handling the copied (and buffered) information from messages received on the ring comprises determining whether such content is intended for and hence to be forwarded to the local clients or is intended for other clients of other servers 210. If the content is intended for other clients not associated with the processing server 210, the copied content may be deleted.

Since typically each server 210 communicates with a manageable group of local UEs 220, each server 210 may have capacity for limiting or controlling the communications delays with the local UEs at a tolerated or acceptable level. Thus, processing local clients' presence information and previously received and copied information that, which may affect communications for the local clients (UEs 220), may be tolerated at lower priority and rate. However, network delays may be caused by different traffic in the network, and thus reducing message forwarding delays between the servers 210 on the ring may be beneficial and significant to reduce overall communications delays of presence information on the network. Assigning higher priority to presence information communications on the network over presence information communications with local clients may improve overall presence information communications efficiency, and thus reduce the number of needed servers 210 and associated network cost.

Upon receiving and processing the received presence information messages on the ring as described above, the server 210 may forward the messages to a next hop server 210 on the ring without additional delays, e.g., without temporarily holding the message in a wait buffer. However, the servers 210 may buffer the information received from local clients and the copied content from the received information on the ring at a determined buffer time. Alternatively, the server 210 may temporarily buffer the received information on the ring (before or after processing) at a shorter time than the information with lower priority. Each server 210 on the ring may similarly process and forward at higher priority the received presence information messages from a previous hop server 210 and process presence information from local clients and copied content from received information on the ring at lower priority.

Additionally, the server 210 may create a new message to send around the ring if any buffered presence updates and/or queries from local clients are not appended into a message sent around the ring within a determined threshold interval. For example, a message may be generated to forward pending (buffered) client's presence information every about 100 millisecond (ms) if the information is not appended to a message on the ring or no message is received on the ring within that time. The server 210 may also send any copied and buffered information from received messages on the ring to corresponding clients at a determined interval. For example, a message comprising received updates and/or queries may be sent to one or more local clients every about 100 ms. One or more updates and/or queries intended for the local clients may be bundled in the same message that is sent to the clients. The bundled information may be located in a dedicated buffer on the server 210.

According to the high and low priority presence information processing scheme above, high priority messages (containing presence updates for multiple users of the network) may be sent at a higher priority around the ring to quickly and efficiently convey presence information to all servers 210 on the ring, which may then act on this information at a lower priority. As load increases, the high priority messages may comprise updates (and/or queries) for more users, but since the rate of originating these messages is controlled, additional load may not increase the number of the messages substantially beyond the determined rate. Updates to individual clients may be buffered as well to increase the likelihood that updates from multiple contacts are bundled and sent to the client in a single message. Distributing presence information at a determined rate around a ring may be suitable for traffic size and characteristics of large enterprises (e.g., with few hundred thousand users and about ten servers). In one exemplary scenario of a large enterprise, where the scheme above may be implemented efficiently and effectively, the number of users or UEs 220 communicating with the servers 210 may be on the order of tens of thousands, for example about 10,000 or 60,000 UEs 220. The number of servers 210 may be less than or equal to about 10 servers 210, for example, 9 or 8 servers 210. Each server may also service about the same number of UEs 220.

A numerical example is provided to demonstrate substantial performance improvements of a ring-based approach as compared with a conventional approach. Suppose the number of presence servers is represented by the positive integer P. Suppose that in each approach a client logs into a server and then: (1) on initial login sends a query/subscribe for each contact (which the server may have to send to another server depending on which server the contact logged into—assuming the initial server somehow knows which server each contact logs into and does not have to broadcast this request to all other servers to find the contact); and (2) on every state change sends the state change to the server it has logged into (and the server, in turn, forks the update to every server into which one of the original client's contacts has logged into). Assume 10,000 users with 100 contacts each, each of the presence servers serve a random set of 10,000/P clients, and assume all 10,00 clients log in within the same one hour interval.

Under the assumptions above, the conventional approach results in: (1) 10,000 client logins; (2) 1,000,000 client to server messages (the query/subscribes—in some conventional systems there are only 10,000 of these directed to "list servers", which then in turn do the fan out to 1,000,000 query/subscribes on the clients behalf—whether the fan out is done directly by the client or indirectly by a list server doesn't really affect the total number of messages very much); (3) $1,000,000*(P-1)/P$ server to server messages (these messages are to get the queries/subscribes to the right server—assuming here each client's 100 contacts log into a perfectly random one of the P servers); (4) $1,000,000*(P-1)$ P responses to the above queries/subscribes; and (5) 10,000 server to client messages (indicating the initial state of all the client's contacts—assuming here these are batched somehow, without this assumption this is 1,000,000 server to client messages). The conventional approach results in a grand total of $2,000,000*(P-1)/P$ server to server messages, 1,010,000 client to server messages (counting logins as "messages") and 10,000 server to client messages. The average messages sent/received per server per second is: (1) messages received (per server per second)=$280/P+(555*(P-1)/P**2)$; and (2) messages sent (per server per second)=$2.8/P+(555*(P-1)/P**2)$.

Under the assumptions above, the ring approach described herein, assuming 100 milliseconds (ms) buffering, results in: (1) 10,000 client logins; (2) 10,000 client to server messages (the initial queries); (3) 10,000 queries (subscribes are redundant) sent around the ring—this means $10,000*(P-1)$ messages altogether assuming no consolidation of requests (this rate is likely not high enough to result in much consolidation of requests); (4) 10,000 query responses sent around the ring; and (5) 10,000 server to client messages (indicating the initial state of all the client's contacts). The ring approach results in a grand total of $20,000*(P-1)$ server to server messages, 20,000 client to server messages, and 10,000 server to client messages. The average messages sent/received per server per second is: (1) messages received (per server per second)=$5.6/P$; and (2) messages sent (per server per second)=$(2.8+5.6)/P=8.4/P$.

A table comparing the conventional and ring approaches, assuming P=10 and the other assumptions detailed above, is presented below.

TABLE 1

Comparison of conventional and ring approaches.

| Approach | Total server to server messages | Total client to server messages | Total server to client messages |
|---|---|---|---|
| Conventional | 1.8 million | 1.01 million | 10,000 |
| Ring | 180,000 | 20,000 | 10,000 |

Note the drastic reduction in the number of presence messages, and therefore traffic, generated using the ring based approach. Similar performance improvements are available during steady state operation in which there are a fixed number of updates per transmitted per client per unit time.

Figure 3:
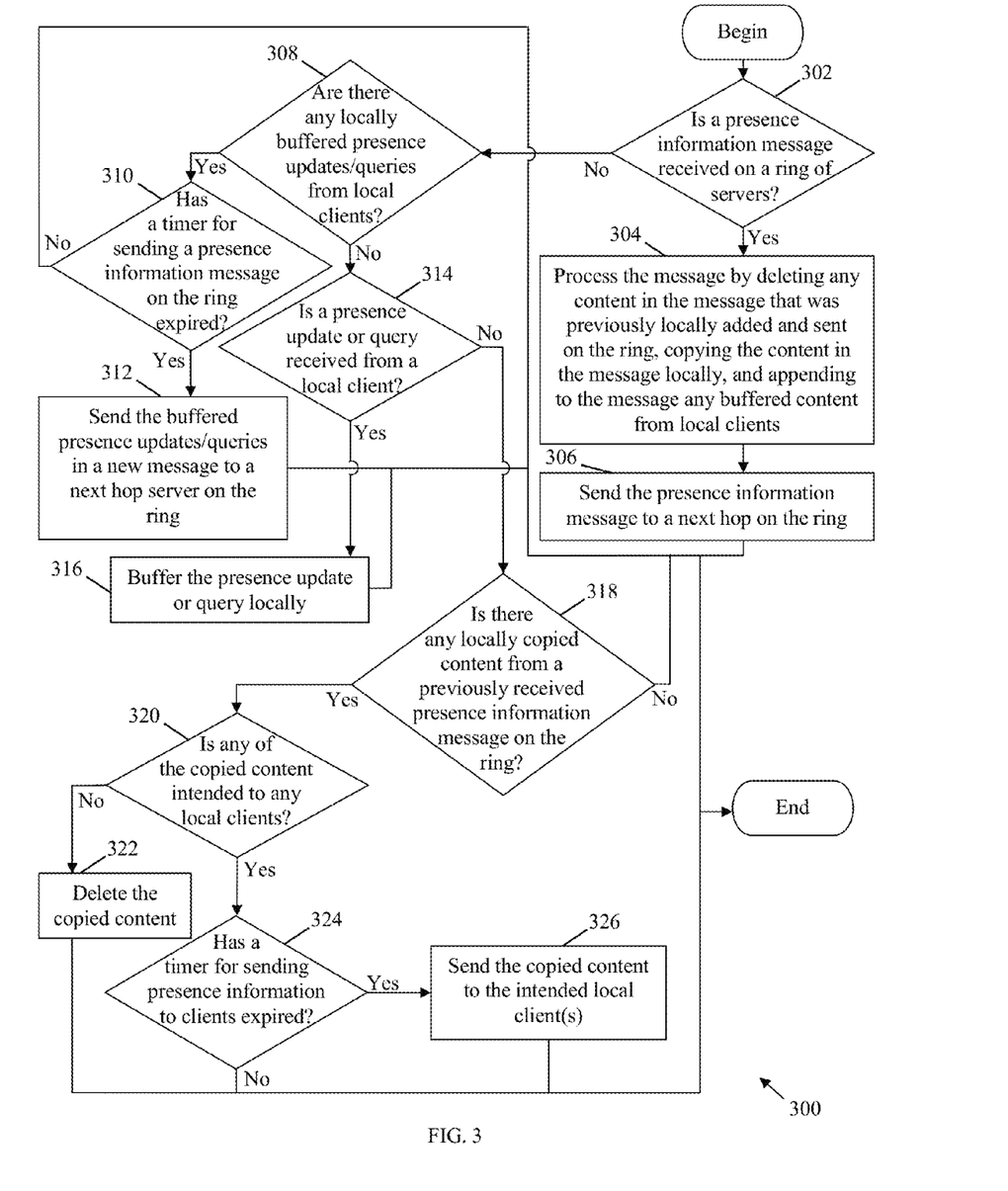
FIG. 3 is a flowchart of a presence distribution method according to an example embodiment of the disclosure.

FIG. 3 illustrates a presence distribution method 300 according to an example embodiment of the disclosure. The presence distribution method 300 may be implemented by a presence server coupled to one or more local clients and to other presence servers in a ring architecture, such as any of the servers 210. The method 300 may start at decision block 302, where the method 300 may determine whether a presence information message is received on a ring of servers. If the condition of block 302 is true, then the method 300 may proceed to block or step 304. Otherwise, the method 300 may proceed to block 308. The message may be processed (by the local server) by deleting any content in the message that was previously locally added and sent on the ring, copying the content in the message locally, and appending to the message any buffered content from local clients. At block 306, the presence information message may be sent to a next hop on the ring. As such, the received message on the ring may be processed at high priority to accelerate the forwarding of the message on the next hop server on the ring. The method 300 may then end.

At block 308, the method 300 may determine whether there are any locally buffered presence updates/queries from local clients. If the condition of block 308 is true, then the method 300 may proceed to block 310. Otherwise, the method 300 may proceed to block 314. At block 310, the method 300 may determine whether a timer for sending a presence information message on the ring has expired. For example, the timer may be set to send a message on the ring every about 100 ms. If the condition of block 310 is true, then the method 300 may proceed to block 312. Otherwise, the method 300 may end. At block 312, the buffered presence updates/queries may be sent in a new message to a next hop server on the ring. The new message may bundle a plurality of updates/queries for a plurality of clients, which may reduce the frequency of sending presence information on the ring and improve efficiency. The method 300 may then end.

At block 314, the method 300 may determine whether a presence update or query is received from a local client. If the condition of block 314 is true, then the method 300 may proceed to block 316. Otherwise, the method 300 may proceed to block 318. At block 316, the presence update or query may be buffered, e.g., in a local buffer. As such, the presence update or query received from a local client may be processed at lower priority to forwarding received or new presence information messages on the ring. The method 300 may then end.

At block 318, the method 300 may determine whether there is any locally copied content from a previously received presence information message on the ring. If the condition of block 318 is true, then the method 300 may proceed to block 320. Otherwise, the method 300 may end. At block 320, the method 300 may determine whether any of the copied content is intended to any local clients. If the condition of block 320 is true, then the method 300 may proceed to block 324. Otherwise, the method 300 may proceed to block 322. At block 322, the copied content may be deleted. The method 300 may then end.

At block 324, the method 300 may determine whether a timer for sending presence information to clients has expired. For example, the timer may be set to send a message to local clients every about 100 ms. If the condition of block 324 is true, then the method 300 may proceed to block 326. Otherwise, the method 300 may then end. At block 326, the copied content may be sent to the intended local client(s). The copied content may comprise one or more presence updates and/or queries for one or more local clients. As such, the presence updates/queries may be sent to local clients at a controlled frequency, which may improve efficiency. The copied updates/queries intended for local clients may also be processed at lower priority to forwarding received or new presence information messages on the ring. The method 300 may then end. In the method 300, the presence update or query received from a local client and the copied content including presence updates/queries for local clients may be processed at about the same priority when no presence information messages are processed and forwarded on the ring. In some example embodiments, the method 300 may be implemented continuously in a loop, where the method 300 may return (after blocks or steps 306, 310, 312, 316, 318, 322, 324, and 326) to block 302 instead of ending.

Figure 4:
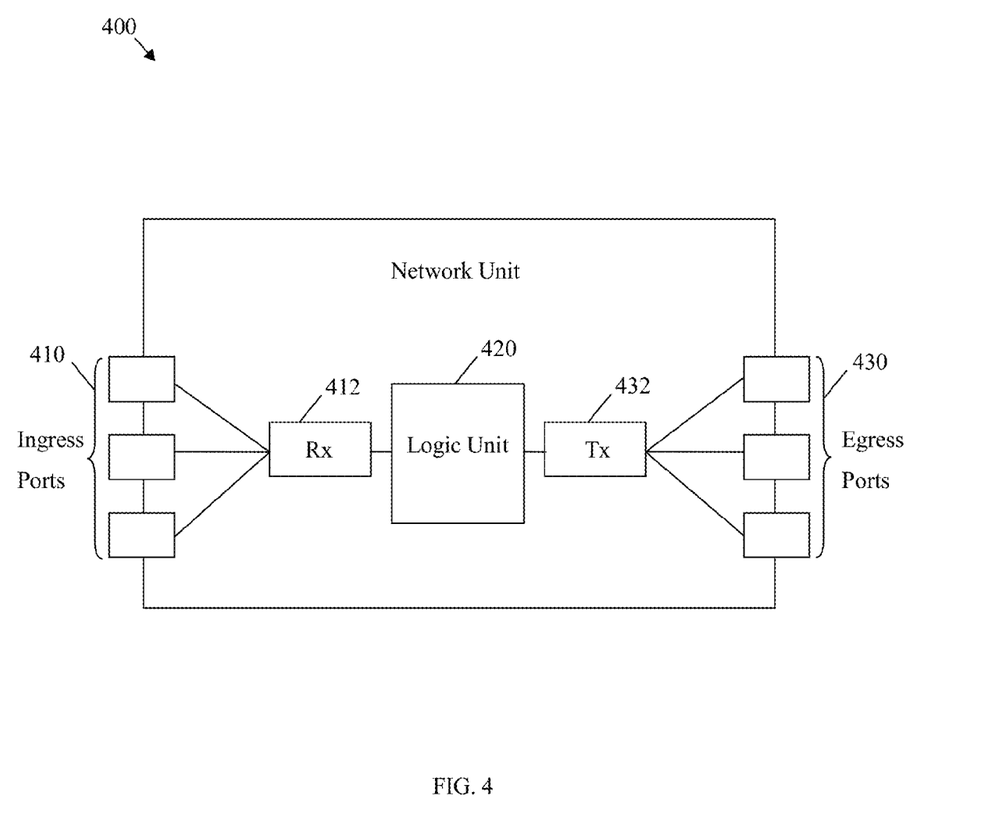
FIG. 4 is a schematic diagram of an example embodiment of a network unit.

FIG. 4 illustrates an example embodiment of a network unit 400, which may comprise or be part of, located at, or coupled to any of the components described above. For example, the network unit 400 may be located at or coupled to any of a plurality of presence servers coupled to each other in a ring topology and to a plurality of local clients, such as the servers 210. The network unit 400 may be any device that transports data through the network. The network unit 400 may comprise one or more ingress ports or units 410 coupled to a receiver (Rx) 412 for receiving signals and packets/data from other network components. The network unit 400 may comprise a logic unit 420 to determine which network components to send data to. The logic unit 420 may be implemented using hardware, software, or both. The network unit 400 may also comprise one or more egress ports or units 430 coupled to a transmitter (Tx) 432 for transmitting signals and packets/data to the other network components. The receiver 412, logic unit 420, and transmitter 432 may also implement or support the schemes and methods described above for processing and forwarding presence information (updates and queries) for the clients on the ring of servers (at high priority) and to/from the clients (at low priority). For instance, the receiver 412, logic unit 420, and transmitter 432 may be configured (via hardware and/or software) to implement or support the schemes described above for the presence distribution ring architecture 200 and the method 300.

Figure 5:
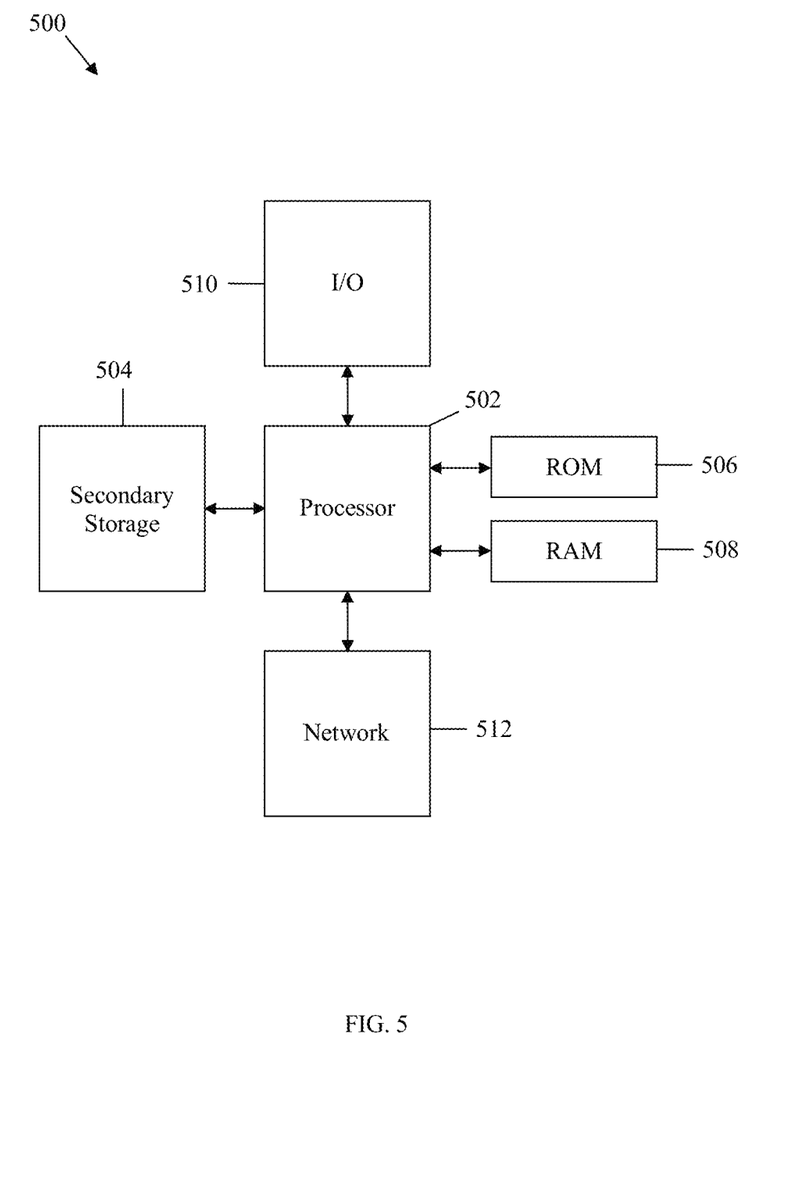
FIG. 5 is a schematic diagram of an example embodiment of a general-purpose network component.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more example embodiments of the components disclosed herein. For example, the network component 500 may comprise or be part of, located at or coupled to any of a plurality of presence servers coupled to each other in a ring topology and to a plurality of local clients, such as the servers 210. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes and methods described above for processing and forwarding presence information (updates and queries) for the clients on the ring of servers (at high priority) and to/from the clients (at low priority). For instance, the processor 502 may be configured (via hardware and/or software) to implement or support the schemes described above for the presence distribution ring architecture 200 and the method 300.

The secondary storage 504 is typically comprised of one or more disk drives or erasable programmable ROM (EPROM) and is used for non-volatile storage of data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one example embodiment is disclosed and variations, combinations, and/or modifications of the example embodiment(s) and/or features of the example embodiment(s) made by a person having ordinary skill in the art are within the scope of the disclosure. Alternative embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are example embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method implemented in a network component, the method comprising:
   receiving a presence information message from a previous presence server positioned at a previous hop in a ring of a plurality of presence servers, wherein the presence information message comprises presence information from a previous client coupled to the previous presence server;
   removing content in the presence information message that has completely traversed the ring;
   copying the presence information message locally for subsequent processing;
   receiving and buffering local presence information from a local client coupled to the network component;
   appending to the presence information message the buffered local presence information; and
   forwarding the presence information message comprising the previous client presence information and the local client presence information to a subsequent presence server positioned at a next hop in the ring,
   wherein forwarding the presence information message is assigned a higher priority than receiving and buffering the local presence information from the local client.

2. The method of claim 1, wherein the presence information message comprises one or more presence updates or queries for one or more clients associated with the plurality of presence servers, and wherein the copied presence information includes one or more presence updates or queries for the local client.

3. The method of claim 1, further comprising:
   bundling additional buffered presence information from the local client into a new presence information message; and
   sending the new presence information message to the subsequent presence server.

4. The method of claim 3, wherein the additional bundled presence information includes one or more presence updates or queries for the local client, and wherein the new presence information message is sent on the ring at a frequency based on a predetermined time interval.

5. The method of claim 4, wherein the predetermined time interval is set to every 100 milliseconds.

6. The method of claim 1, further comprising:
   receiving presence information comprising a presence update or query from the local client; and
   buffering the presence information.

7. The method of claim 6, wherein receiving and copying the presence information message on the ring has a higher priority than receiving and buffering the local presence information.

8. The method of claim 1, further comprising:
   sending at least some content of the locally copied presence information message from one or more previously received presence information messages to the local client; and
   deleting at least some of the content of the locally copied presence information message when the content is not intended for the local client.

9. The method of claim 8, wherein receiving, copying, and forwarding the presence information message on the ring has higher priority than sending or deleting the content of the locally copied presence information message.

10. The method of claim 8, wherein the content copied locally is sent to one or more intended clients at a frequency based on a predetermined time interval.

11. The method of claim 10, wherein the predetermined time interval is set to every 100 milliseconds.

12. A method for forwarding presence information implemented in a presence server coupled to a plurality of presence servers in a ring architecture, the method comprising:
   receiving a presence information message on a link from a previous presence server positioned at a previous hop in the ring, wherein the presence information message comprises presence information from a previous client coupled to the previous presence server;
   processing the presence information message by removing content in the presence information message that has completely traversed the ring;
   receiving and buffering local presence information from a local client coupled to the presence server;
   processing the local presence information by appending the local client presence information to the presence information message;
   forwarding the presence information message comprising the previous client presence information and the local client local presence information to a subsequent presence server positioned at a next hop in the ring; and
   processing previously received and buffered presence information intended for one or more local clients coupled to the presence server,
   wherein forwarding the presence information message has a higher priority than buffering the local presence information from the local client.

13. The method of claim 12, wherein processing the presence information message further comprises copying the content of the presence information message locally for subsequent processing.

14. The method of claim 12, further comprising:
receiving additional local presence information;
buffering the additional local presence information locally at the presence server; and
bundling the additional local presence information with other buffered local presence information for one or more local clients into a new presence information message; and
sending the new presence information message to the next hop on the ring.

15. The method of claim 12, wherein processing the previously received and buffered presence information comprises sending the previously received and buffered information to the one or more local clients.

16. A network component for processing and forwarding presence information to a plurality of presence servers coupled via a ring in one or more networks and a plurality of user devices coupled to the presence server, the network component comprising:
one or more transmitters;
one or more receivers configured to:
 receive a local presence information message comprising local presence information from one or more local user devices coupled to the network component; and
 receive a received presence information message from a previous hop on the ring, wherein the received presence information message comprises previous presence information from a previous user device coupled to a previous presence server; and
a processor coupled to the receivers and transmitters, wherein the processor is configured to:
 buffer the local presence information from the local presence information message;
 process and forward the received presence information message by:
  removing content from the received presence information message that has completely traversed the ring;
  buffering content in the received presence information message intended for the local user devices coupled to the network component;
  appending the local presence information of the local user devices to the previous presence information of the previous user device in the received presence information message; and
  forwarding the received presence information message toward a subsequent hop on the ring via the transmitters; and forward, via the transmitters, the buffered content intended for the local user devices coupled to the network component,
wherein forwarding the received presence information message is assigned a higher priority than buffering the local presence information and forwarding the buffered content intended for the local user devices.

17. The network component of claim 16, wherein a number of presence servers on the ring is less than or equal to ten, and wherein a number of user devices coupled to the presence server is at least ten thousand.

18. The network component of claim 16, wherein the received presence information message comprises one or more presence updates for one or more corresponding users that indicate current availability status to one or more contacts that have subscribed to obtain presence information from the users.

19. The network component of claim 16, wherein the received presence information message forwarded on the ring comprises one or more presence queries sent to one or more corresponding users to indicate current availability status to one or more contacts subscribed to obtain presence information from the users.

20. The network component of claim 19, wherein one or more presence updates are sent when the one or more user devices receive the one or more presence queries from one or more presence servers.

21. A computer program product in a non-transitory computer readable media comprising:
first instructions executable by a processor for receiving a presence information message from a previous presence server positioned at a previous hop in a ring of a plurality of presence servers, wherein the presence information message comprises presence information from a previous client coupled to the previous presence server;
second instructions executable by the processor for removing content in the presence information message that has completely traversed the ring;
third instructions executable by the processor for copying the presence information message locally for subsequent processing;
fourth instructions executable by the processor for receiving and buffering local client presence information from a local client coupled to the network component;
fifth instructions executable by the processor for appending to the presence information message the buffered local client presence information; and
sixth instructions executable by the processor for forwarding the presence information message comprising the previous client presence information and the local client presence information to a subsequent presence server in the ring,
wherein forwarding the presence information message has a higher priority than buffering the local client presence information from the local client.

22. The computer program product of claim 21, wherein the presence information message comprises one or more presence updates or queries for one or more clients associated with the plurality of presence servers.

23. The computer program product of claim 21, further comprising:
seventh instructions executable by the processor for bundling additional buffered local client presence information from the local client into a new presence information message; and
eight instructions executable by the processor for sending the new presence information message to the subsequent presence server.

24. The method of claim 1, wherein the presence information message is forwarded by employing Session Initiation Protocol (SIP) for Instant Messaging and Presence Leveraging Extensions (SIMPLE).

25. The network component of claim 16, wherein the received presence information message is forwarded by employing Session Initiation Protocol (SIP) for Instant Messaging and Presence Leveraging Extensions (SIMPLE).

26. The computer program product of claim 21, wherein the presence information message is forwarded by employing Session Initiation Protocol (SIP) for Instant Messaging and Presence Leveraging Extensions (SIMPLE).

* * * * *